United States Patent
Kadam et al.

(10) Patent No.: US 11,198,076 B2
(45) Date of Patent: Dec. 14, 2021

(54) BI-DIRECTIONAL NO FILTER NO RUN PIN

(71) Applicant: CUMMINS FILTRATION IP, INC., Columbus, IN (US)

(72) Inventors: Pravin Shantinath Kadam, Kolhapur (IN); Sudhindra Palaxa Arakeri, Shahapur (IN); Kevin C. South, Cookeville, TN (US); Ismail C. Bagci, Cookeville, TN (US); Peter K. Herman, Stoughton, WI (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 99 days.

(21) Appl. No.: 16/473,476

(22) PCT Filed: Dec. 19, 2017

(86) PCT No.: PCT/US2017/067293
§ 371 (c)(1),
(2) Date: Jun. 25, 2019

(87) PCT Pub. No.: WO2018/125671
PCT Pub. Date: Jul. 5, 2018

(65) Prior Publication Data
US 2020/0147529 A1    May 14, 2020

(30) Foreign Application Priority Data
Dec. 27, 2016  (CN) .......................... 201621452168.7

(51) Int. Cl.
*B01D 29/96* (2006.01)
*B01D 29/15* (2006.01)
(Continued)

(52) U.S. Cl.
CPC ............. *B01D 29/96* (2013.01); *B01D 29/15* (2013.01); *B01D 35/005* (2013.01);
(Continued)

(58) Field of Classification Search
None
See application file for complete search history.

(56) References Cited

U.S. PATENT DOCUMENTS

| 2,676,708 A | 4/1954 | Risk |
| 4,125,469 A | 11/1978 | Henton et al. |

(Continued)

FOREIGN PATENT DOCUMENTS

| CN | 206419137 | 8/2017 |
| WO | WO-2016/018673 | 2/2016 |

(Continued)

OTHER PUBLICATIONS

International Search Report and Written Opinion from corresponding PCT Application No. PCT/US2017/067293, dated Mar. 8, 2018, pp. 1-7.

(Continued)

*Primary Examiner* — David C Mellon
(74) *Attorney, Agent, or Firm* — Foley & Lardner LLP

(57) ABSTRACT

A no filter no run bidirectional pin element is disclosed. A shell housing is removably coupled to a filtration housing, a removable no filter no run attachment, and a filter element. The filter element comprises a filtration media and a bidirectional pin element. The bidirectional pin element comprises a center tube formed as a single piece with a bidirectional pin. The installation of the filter element and the shell housing into the filtration system results in the bidirectional pin entering a pin aperture of the removable no filter no run attachment and the bidirectional pin preventing the operative engagement of a blocking element with a divider inside the no filter no run attachment.

12 Claims, 6 Drawing Sheets

(51) Int. Cl.
  *B01D 35/147* (2006.01)
  *B01D 35/153* (2006.01)
  *B01D 35/30* (2006.01)
  *F02M 37/42* (2019.01)
  *F02M 37/32* (2019.01)
  *B01D 35/00* (2006.01)

(52) U.S. Cl.
  CPC ......... *B01D 35/147* (2013.01); *B01D 35/153* (2013.01); *B01D 35/306* (2013.01); *F02M 37/32* (2019.01); *F02M 37/42* (2019.01); *B01D 2201/0415* (2013.01); *B01D 2201/4053* (2013.01)

(56) References Cited

U.S. PATENT DOCUMENTS

| | | | |
|---|---|---|---|
| 4,192,751 A | 3/1980 | Henton et al. | |
| 4,300,517 A | 11/1981 | Astansky et al. | |
| 5,736,040 A | 4/1998 | Duerrstein et al. | |
| 5,846,417 A * | 12/1998 | Jiang | F02M 37/28 |
| | | | 210/235 |
| 6,068,763 A | 5/2000 | Goddard | |
| 6,884,349 B1 | 4/2005 | Jiang | |
| 10,710,009 B2 | 7/2020 | Straussberger et al. | |
| 2008/0179236 A1 | 7/2008 | Wieczorek et al. | |
| 2009/0020465 A1* | 1/2009 | Jiang | B01D 29/58 |
| | | | 210/119 |
| 2012/0024771 A1 | 2/2012 | Abdalla et al. | |
| 2013/0081996 A1 | 4/2013 | Kamp et al. | |
| 2013/0118974 A1 | 5/2013 | Hacker | |
| 2015/0273369 A1* | 10/2015 | Le Ven | B01D 29/90 |
| | | | 210/235 |

FOREIGN PATENT DOCUMENTS

| | | |
|---|---|---|
| WO | WO-2016/036730 | 3/2016 |
| WO | WO-2017/155974 | 9/2017 |

OTHER PUBLICATIONS

International Search Report and Written Opinion issued for PCT/US2015/066979, dated Feb. 25, 2016, 14 pages.

Non-Final Office Action from U.S. Appl. No. 15/537,588, dated Aug. 14, 2019.

* cited by examiner

BI-DIRECTIONAL NO FILTER NO RUN PIN

CROSS-REFERENCE TO RELATED APPLICATIONS

This application is the U.S. nation phase of PCT Application No. PCT/US2017/067293, filed Dec. 19, 2017, which claims priority to and benefit of Chinese Utility Model Application No. 2016214521687, filed Dec. 27, 2016, and entitled "Filtration Systems and Filter Element," now granted as Chinese Utility Model Patent No. ZL2016214521687 The disclosures of the foregoing are incorporated herein by reference.

TECHNICAL FIELD

The present disclosure relates generally to filtration systems having replaceable filter elements.

BACKGROUND

Internal combustion engines generally combust a mixture of fuel (e.g., gasoline, diesel, natural gas, etc.) and air. Prior to entering the engine, fluids, such as fuel and oil, are typically passed through filter elements to remove contaminants (e.g., particulates, dust, water, etc.) from the fluids prior to delivery to the engine. The filter elements require periodic replacement as the filtration media of the filter elements captures and removes the contaminants from the fluids passing through the filtration media. In some cases, unauthorized or non-genuine replacement filter elements may be installed in the filtration systems during servicing operations. The unauthorized and non-genuine replacement filter elements may be of inferior quality compared to genuine, authorized filter elements. The use of unauthorized or non-genuine replacement filter elements may cause damage to the engine by allowing contaminants to pass through the filter element.

Some engine and filtration system implement various engine integrity protection ("EIP") features, such as the implementation of no filter no run ("NFNR") systems. In an NFNR system, the engine will either not run or run in a limited capacity (e.g., in a limp mode) if no filter element is installed in the filtration system or, in some instances, if an improper filter element is installed. However, many engine and filtration systems are not equipped with such EIP features. These engine and filtration systems are therefore susceptible to damage if used without any filter element or with improper replacement filter elements. In engine and filtration systems that utilize NFNR systems, there is an inability to provide an NFNR pin on the endplates of the NFNR systems due to the presence of an electronic pump and the height of the electronic pump.

SUMMARY

One embodiment relates to a filtration system. The system comprises a shell housing removably coupled to a filtration housing, a removable no filter no run attachment, and a filter element. The filter element comprises a filtration media and a bidirectional pin element. The bidirectional pin element comprises a center tube formed as a single piece with a bidirectional pin. The installation of the filter element and the shell housing into the filtration system results in the bidirectional pin entering a pin aperture of the removable no filter no run attachment and the bidirectional pin preventing the operative engagement of a blocking element with a divider inside the no filter no run attachment.

Another embodiment relates to a filter element. The filter element comprises a filtration media. The filter element further comprises a bidirectional pin element. The bidirectional pin element comprises a center tube formed as a single piece with a bidirectional pin. The installation of the filter element and the shell housing into the filtration system results in the bidirectional pin entering a pin aperture of a removable no filter no run attachment and the bidirectional pin preventing the operative engagement of a blocking element with a divider inside the no filter no run attachment.

Yet another embodiment relates to a method for installing a filtration assembly including a shell housing, the shell housing being removably coupleable to a filtration housing A removable no filter no run attachment is positioned in the shell housing. A genuine filter element is provided. The genuine filter element comprises a filtration media, and a bidirectional pin element. The bidirectional pin element comprises a center tube formed as a single piece with a bidirectional pin. The bidirectional pin includes a first no filter no run pin and a second no filter no run pin positioned along a longitudinal axis of the filter element and extending in opposite direction to each other. The genuine filter element is inserted into the shell housing. The insertion of the genuine filter element causes the first no filter no run pin or the second no filter no run pin of the bidirectional pin, based on an orientation of the filter element, to enter a pin aperture of the no filter no run attachment. The bidirectional pin prevents the operative engagement of a blocking element with a divider inside the no filter no run attachment so as to allow a fluid to flow therethrough These and other features, together with the organization and manner of operation thereof, will become apparent from the following detailed description when taken in conjunction with the accompanying drawings.

DETAILED DESCRIPTION

Referring to the figures generally, a center tube is provided that is formed as a single piece with a NFNR bidirectional pin that achieves the functional intent of an NFNR ball regardless of assembly orientation. The NFNR bidirectional pin is formed as a single unit with the center tube (the combination referred to herein as the "NFNR bidirectional pin element") is beneficial for a manufacturer that is unable to add a NFNR pin on an end plate due to shorter pump height, pump orientation, longer slit width media, and related issues. Since the NFNR bidirectional pin formed as a single unit with the center tube can ensure functionality of a NFNR ball system irrespective of assembly orientation, the element can be coupled onto an existing filtration system without significant modification to the existing electronic pump. As will be appreciated, the NFNR bidirectional pin element provides improvements to an NFNR pin on an end plate system by decreasing chances of breakage during transportation, minimizing complexity, and reducing costs as both the endcap (e.g., endplate) and gasket are the same in the filter element. The NFNR bidirectional pin element prevents the equipment associated with the filtration system (e.g., an internal combustion engine) from being operated without a filtration media element. Further, the NFNR bidirectional pin element prevents the equipment supplied by the filtration system from being operated with an unauthorized or non-genuine replacement filter cartridge or filter element. The NFNR bidirectional pin element thus safeguards against damage to downstream components of the filtration system and malfunctions of equipment in which the filtration system is used.

Figure 1:
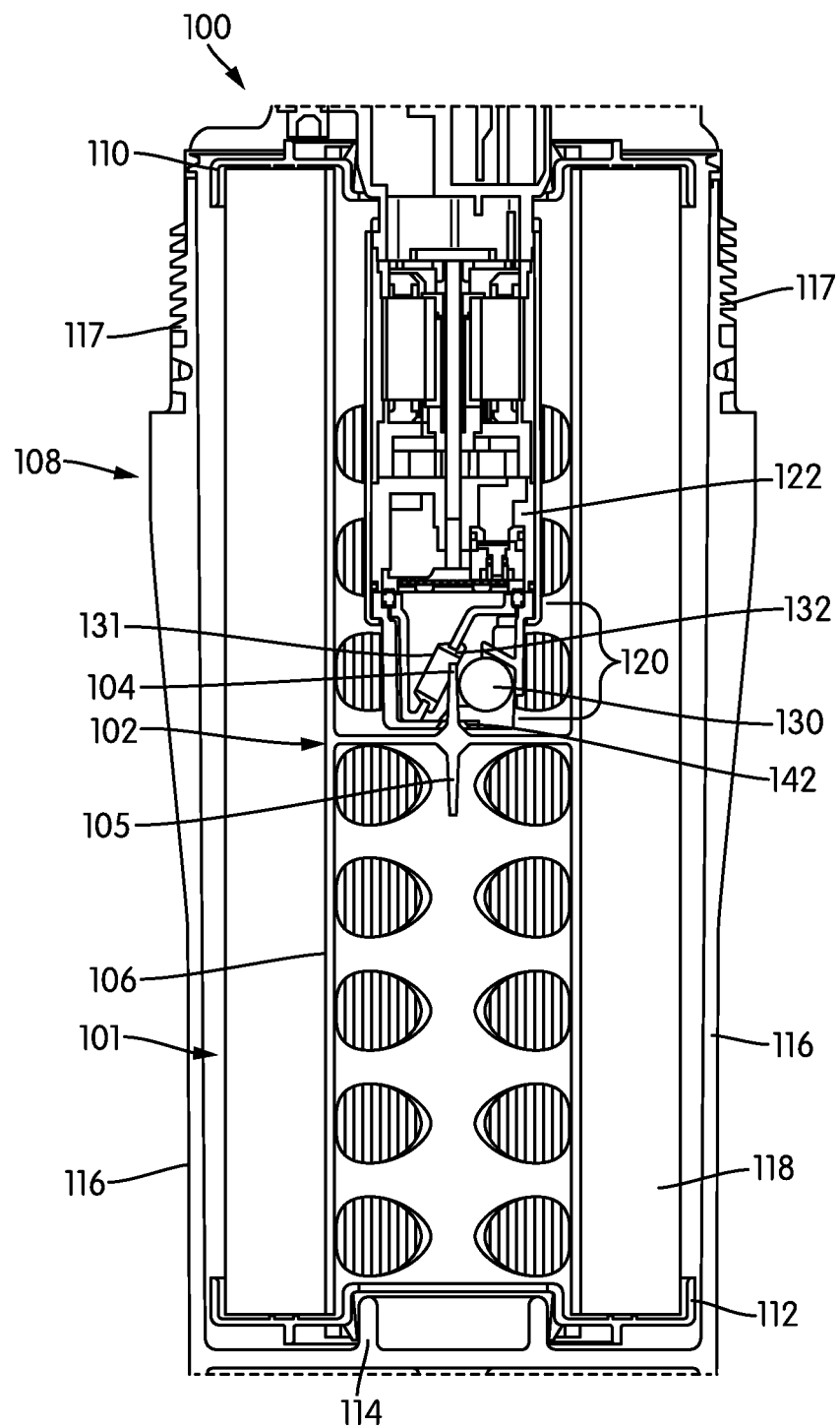
FIG. 1 is a lateral cross-sectional view of a filter assembly that includes a NFNR bidirectional pin element, according to an example embodiment.

Referring to FIG. 1, a lateral cross-sectional view of a filtration assembly 100 that includes the NFNR bidirectional pin element 102 is illustrated, according to an example embodiment. The filtration assembly 100 includes a filter element 101, a shell housing 108, a top endcap 110, a bottom endcap 112, a NFNR attachment 120, and a pump inlet 122. The filter element 101 includes the NFNR bidirectional pin element 102 and a filtration media 118. The NFNR bidirectional pin element 102 includes a center tube 106 formed as a single piece with a first NFNR pin 104 and a second NFNR pin 105. As will be appreciated, when a genuine filter cartridge is installed into the filtration assembly 100, the NFNR bidirectional pin element 102 prevents an NFNR ball 130 (e.g., blocking member) from moving into a grommet bore 131, thereby allowing fluid to flow through the filtration system.

The shell housing 108 is an external housing of the filter element 101. The shell housing 108 defines a shell wall 116, an end wall 114, and shell threads 117. In some arrangements, the shell housing 108 is cylindrical in shape (although other shapes are possible). The shell housing 108 is removably connected to the filtration housing (not shown) via a threaded connection formed by the shell threads 117 on the shell housing 108. The filtration system includes a filter element 101. The filter element 101 is removably installed within the shell housing 108 such that when the shell housing 108 is installed onto (e.g., threaded onto) the filtration housing, the filter element 101 is also installed in the filtration system (e.g., as shown in FIG. 1). Generally, fluid to be filtered flows into the shell housing 108, through the filter element 101 in an outside-in flow arrangement, and out the filtration housing. In alternative arrangements, the flow may be via an inside-out arrangement. The shell housing 108 may be formed of various plastics selected to provide a firm housing while resisting degradation and wear due to exposure to fluid flows, including flows of diesel or unleaded fuel (e.g., plastics).

The filter element 101 shown in FIG. 1 is an authorized filter element and is structured to interact with the NFNR attachment 120. As discussed above, the NFNR bidirectional pin element 102 is defined by the center tube 106 formed as a single piece with the first NFNR pin 104 and the second NFNR pin 105. The second NFNR pin 105 mirrors the first NFNR pin 104 and both are axially disposed relative to each other. The first NFNR pin 104 corresponds to the size and location of the pin aperture 142 of the NFNR attachment 120. Upon installation of the genuine filter element 101, the first NFNR pin 104 is disposed through the pin aperture 142 such that a tip of the first NFNR pin 104 is positioned adjacent to the grommet 132. When installed, the first NFNR pin 104 of the NFNR bidirectional pin element 102 prevents an NFNR ball 130 from moving into a grommet bore 131, thereby allowing fluid to flow through the filtration system.

As will be appreciated, the NFNR bidirectional pin element 102 allows for the NFNR attachment 120 to be positioned on the bottom of the filtration assembly 100 and engage the second NFNR pin 105 instead of the first NFNR pin 104. In those arrangements, upon installation of the genuine filter element 101, the second NFNR pin 105 is disposed through the pin aperture 142 such that a tip of the second NFNR pin 105 is positioned adjacent to the grommet 132. As described herein, the second NFNR pin 105 can perform the same functions and has the same features as the first NFNR pin 104. The filtration media 118 is positioned around the center tube 106. The center tube 106 may comprise a plurality of apertures so as to allow the fluid (e.g., air, fuel, lubricant, oil etc.) to flow into the center of the center tube 106 after passing through the filtration media 118. The center tube 106 may be formed from plastic, metals or any other suitable material. The filtration media 118 may have a shape and size corresponding to a shape defined by the internal volume of the shell housing 108 (e.g., a cylindrical shape having a circular cross-sectional). The center tube 106 may have disposed inside it the pump inlet 122 and the coupled NFNR attachment 120, as well as a plurality of sidewall apertures allowing fluid communication between the filtration media 118 and the upstream fluid aperture of the NFNR attachment 120.

The filter element 101 includes an top endcap 110 and a bottom endcap 112. The endcap comprises an alignment tab configured to rotationally lock the filter element 101 with respect to the shell housing 108 during an installation of the filter element 101 into the shell housing 108. The top endcap 110 and the bottom endcap 112 are coupled to the filtration media 118 of the filter element 101. In some embodiments, the endcaps 110,112 includes alignment tabs received in slots of the shell housing 108 and rotationally lock the filter element 101 with respect to the shell housing 108. Accordingly, when the shell housing 108 is installed by rotating the shell housing 108 into the filtration housing, the filter element 101 rotates with the shell housing 108.

As shown in FIG. 1, the NFNR attachment 120 includes an NFNR ball 130, a grommet bore 131, and a grommet 132. The NFNR attachment 120 is removable from filtration assembly 100 and can be installed on the bottom of the unit (e.g., installed to mirror the installation as shown in FIG. 1). In some arrangements, the NFNR attachment 120 is formed separately and distinctly from the pump inlet 122, and may be retrofitted to the pump inlet 122, thereby providing a retrofit solution for filtration systems not originally designed with an NFNR EIP feature. The NFNR attachment 120 may contain various embodiments and orientations that make use of an NFNR ball 130 and an internal aperture/grommet bore 131. Generally, when a genuine filter element 101 is installed, the first NFNR pin 104 (or second NFNR pin 105 if the NFNR attachment 120 is flipped) prevents the NFNR ball 130 from blocking the grommet bore 131, thereby allowing passage of fluid through the grommet bore 131. Alternatively, when a non-genuine filter element is installed, a fluid flow may press the NFNR ball 130 up against the grommet 132 and block the grommet bore 131, thereby preventing passage of fluid through the grommet bore 131 and through the filter element 101. In turn, if the fluid flow abates, the NFNR ball 130 may disengage from the grommet 132 and expose the grommet bore 131. The structure of the NFNR attachment is described in greater detail below in FIGS. 3A-3C A pump inlet 122 is disposed within the center tube 106 of a genuine or authorized filter element 101. The pump inlet 122 is in fluid providing communication with a fluid pump (e.g., an electric fluid pump, a mechanical fluid pump, etc.) that draws a fluid from a reservoir (e.g., fuel, oil, hydraulic fluid, water, etc.) through the genuine filter element 101, into the NFNR attachment 120, and into the pump inlet 122. Filtered fluid in the pump inlet 122 is then provided to a system via the associated pump, such as an internal combustion engine. In some arrangements, the NFNR attachment 120 is permanently coupled to the pump inlet 122 such that a subsequent removal of the NFNR attachment 120 would damage the pump inlet 122 and/or otherwise disrupt the operation of the pump inlet 122.

In operation, the genuine filter element 101 is assembled and coupled to the shell housing 108 using the top and bottom endcaps 110, 112. The genuine filter element 101 disposes the first NFNR pin 104 into a pin aperture 142 in the NFNR attachment 120 between the grommet 132 and the NFNR ball 130. An associated fluid pump is actuated (e.g., via actuation of an associated internal combustion engine), giving rise to a fluid flow across the filtration media 118, through the center tube 106 and into the upstream portion of the NFNR attachment 120. The fluid flow encounters and flows into the NFNR ball 130; however, the first NFNR pin 104 prevents the NFNR ball 130 from moving into and blocking the grommet bore 131. As such, the fluid flow may flow around the first NFNR pin 104 and the NFNR ball 130, through the grommet bore 131 into the downstream portion of the NFNR attachment 120, into the pump inlet 122, and then to the system (e.g., the internal combustion engine).

Figure 2A:
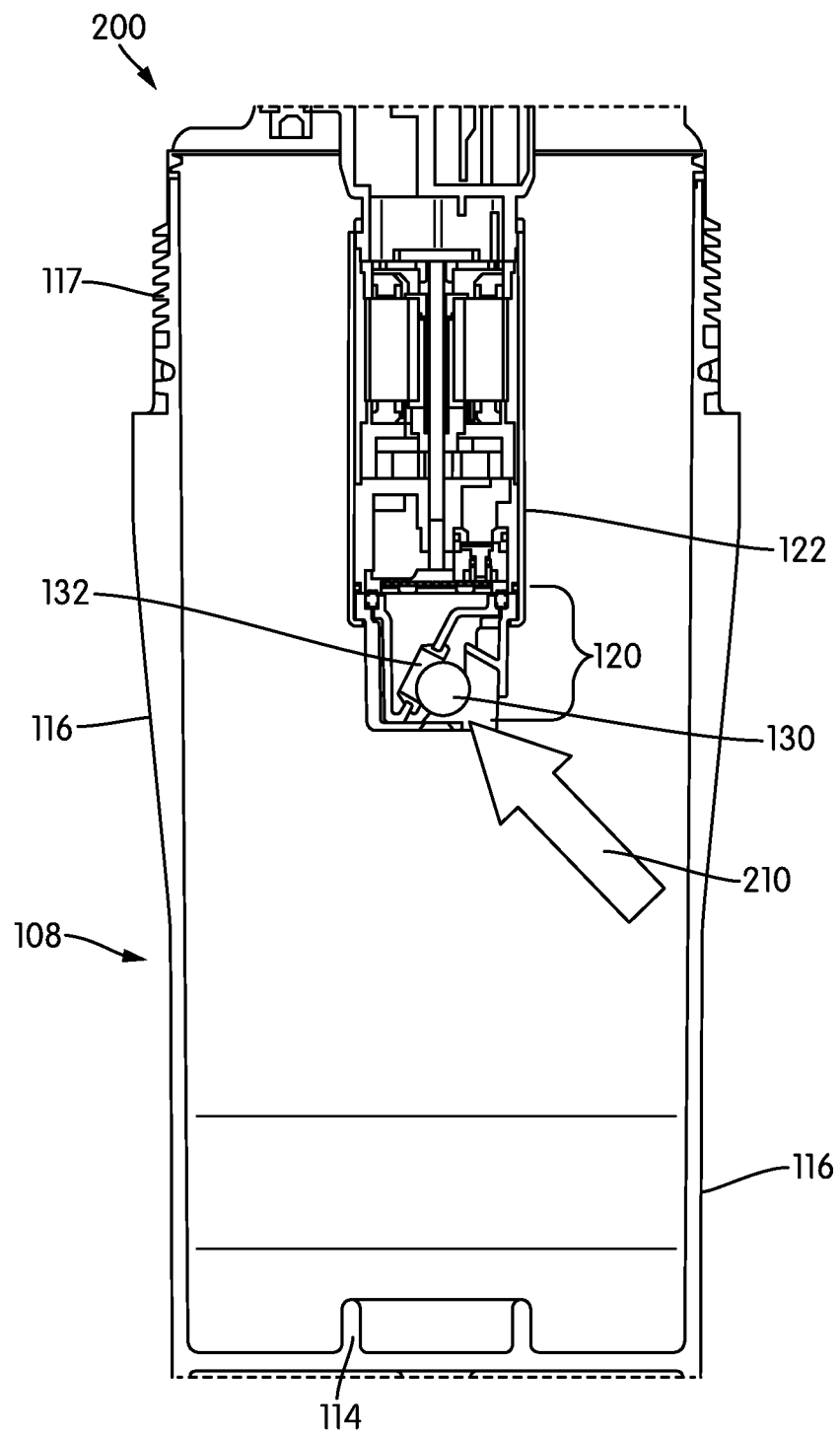
FIG. 2A is a lateral cross-sectional view of the filter assembly without the NFNR bidirectional pin element shown in FIG. 1.

Referring now to FIG. 2A, a lateral cross-sectional view of the filter assembly 200 without the NFNR bidirectional pin element 102 shown in FIG. 1 is illustrated. Without the NFNR bidirectional pin element 102, a fluid flow 210 into the upstream fluid aperture 144 will push the NFNR ball 130 toward and partially into the grommet bore 131 of the grommet 132, thereby blocking the fluid flow from reaching the downstream portion and, ultimately, the pump inlet 122.

Figure 2B:
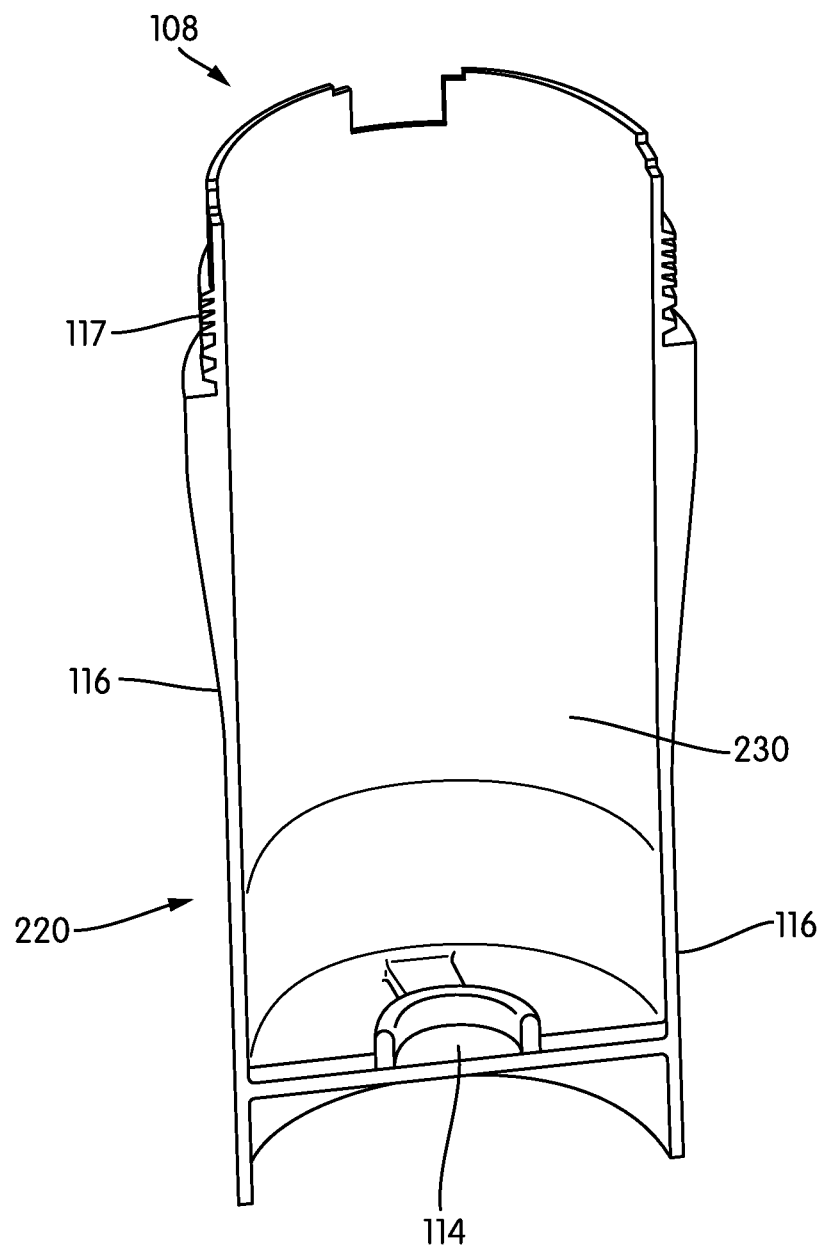
FIG. 2B is a lateral cross-sectional perspective view of the shell housing shown in FIG. 1.

FIG. 2B is a lateral cross-sectional perspective view of the shell housing 108 shown in FIG. 1. The shell housing 108 is designed to receive a filter cartridge therein for filtering the fluid. The shell housing 108 includes a housing body 220 that has a shell wall 116 and an end wall 114. The shell wall 116 and the end wall 114 define a filter cartridge space 230 that is large enough to receive the filter cartridge therein, with the end wall 114 forming a closed end of the space 230. Due to the bidirectional orientations of the NFNR attachment 120 (not shown) and the electric pump, a hole will be disposed in the shell housing 108 opposite the assembly of the NFNR attachment 120 and the electric pump (e.g., as the hole corresponds to the location for which the NFNR attachment 120 and the electric pump could have been assembled). Accordingly, the end wall 114 is plugged by some apparatus or feature, thereby shutting off the end wall 114 hole. The housing body 220 has an open end generally opposite the end wall 114. The housing body 220 also includes shell threads 117 formed at the upper end of the shell wall 116. When the filter assembly is in use, a lid including external threads can be screwed onto the housing body 220 by engaging the external threads of a filtration housing or lid with the shell threads 117.

Figure 2C:
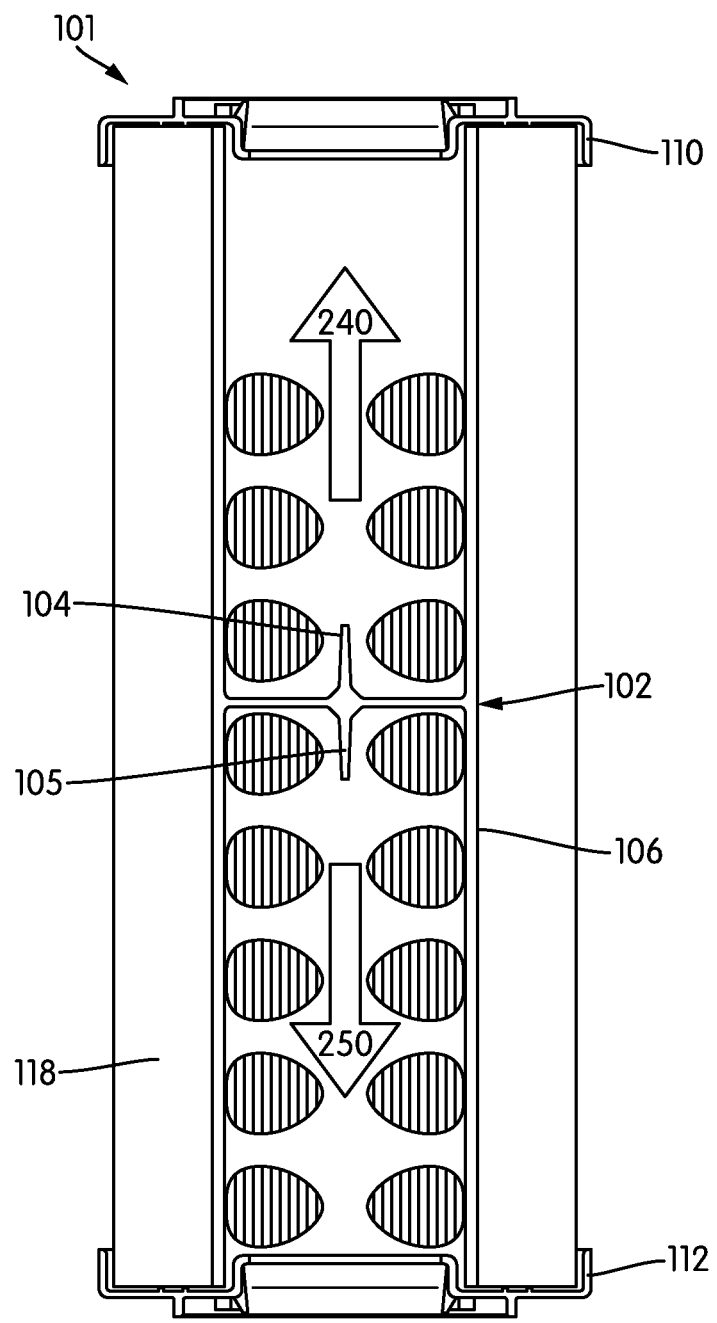
FIG. 2C is a lateral cross-sectional view of the NFNR bidirectional pin element shown in FIG. 1.

FIG. 2C is a lateral cross-sectional view of the NFNR bidirectional pin element 102 of the filter element 101 shown in FIG. 1. The filter element 101 includes the NFNR bidirectional pin element 102, the filtration media 118, the top endcap 110, and the bottom endcap 112. As will be appreciated, formed as a single piece/unit refers to forming a single, discrete cohesive unit, i.e., the single piece/unit cannot be disassembled without damage or destruction to the piece/unit. As shown in FIG. 2C, the center tube 106, the first NFNR pin 104 and the second NFNR pin 105 are formed to create one cohesive shape and one continuous unit. Having the first and second NFNR pin 104, 105 formed as a single piece with the center tube 106 overcomes the inability to add a NFNR pin on the top endcap 110 or the bottom endcap 112 due to the integration of the electric pump inside of the filter element 101. The first NFNR pin 104 and the second NFNR pin 105 are both axially disposed and the second NFNR pin 105 mirrors the first NFNR pin 104, allowing installation of the NFNR attachment 120 on either side of the NFNR bidirectional pin element 102.

As will be appreciated, the NFNR bidirectional pin element 102 is designed to achieve the functional intent of the NFNR attachment 120 (not shown) irrespective of assembly orientation. The NFNR attachment 120 and electronic pump may be assembled at the top 240 of the filtration assembly 100 or at the bottom 250 of the filtration assembly 100, as the NFNR bidirectional pin element 102 has NFNR pins that protrude in both directions axially. For example, if the NFNR attachment 120 is installed at the top 240, the pin aperture 142 of the NFNR attachment will receive the first NFNR pin 104 disposed on the top of the center of the NFNR bidirectional pin element 102. Conversely, if the NFNR attachment 120 is installed at the bottom 250, the pin aperture 142 of the NFNR attachment will receive the second NFNR pin 105 disposed on the bottom of the center of the NFNR bidirectional pin element 102. Depending on the orientation of the NFNR attachment 120 and electric pump, the opposite hole would be plugged by a feature in the shell housing 108. For example, if the NFNR attachment 120 and electric pump were disposed at the top 240, then the bottom 250 would make use of a housing plug, sealable bottom endcap 112, or similar feature to prevent fluid loss. In some embodiments, the shell housing 108 may be formed to be closed in one end, thereby producing two mirrored shell housings, for which the shell housing 108 that matches the assembly of the NFNR attachment 120 and electric pump will be used to removably install the filter element 101 within the shell housing 108.

Figure 3A:
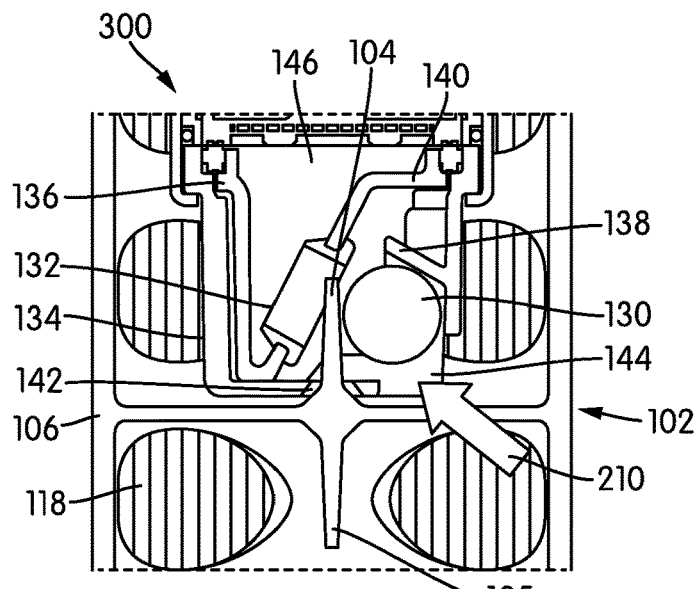
FIG. 3A is a lateral cross-sectional view of a portion of a filtration assembly that includes the NFNR bidirectional pin element of FIG. 1 and a genuine or authorized filter element.
Figure 3B:
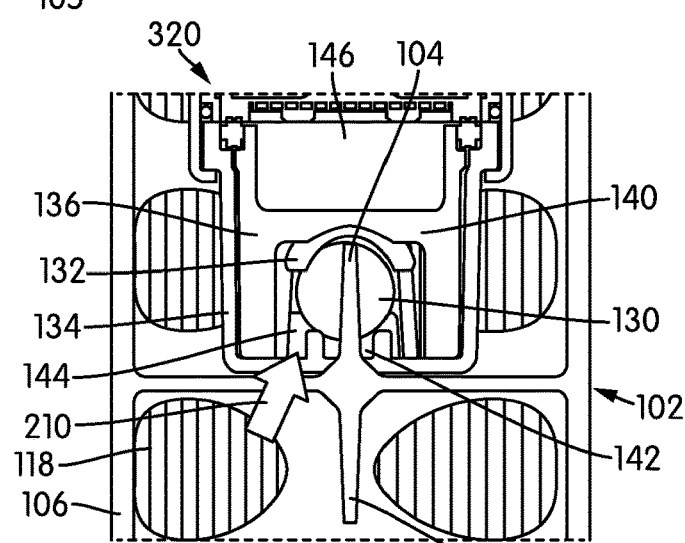
FIG. 3B is a front cross-sectional view of a portion of a filtration assembly that includes the NFNR bidirectional pin element of FIG. 1 and a genuine or authorized filter element.

Referring now to FIGS. 3A and 3B, a lateral cross-sectional view 300 and a frontal cross-sectional view 320 of the NFNR bidirectional pin element 102 and the NFNR attachment 120 are illustrated. The NFNR attachment 120 includes the NFNR ball 130, the grommet bore 131, the grommet 132, a shell 134, a cage 136, a protrusion 138, a divider 140, a pin aperture 142, an upstream portion 144, and a downstream portion 146. In some arrangements, the shell 134, the cage 136, and the grommet 132 may be independently formed and later assembled together into the NFNR attachment 120. In other arrangements, the features of at least the shell 134 and the cage 136 are formed as a unitary structure.

The shell 134 may be formed of various plastics selected to provide a firm housing while resisting degradation and wear due to exposure to fluid flows 210, including flows of diesel or unleaded fuel (e.g., plastics). The shell 134 defines an upstream fluid portion 144 at a first end and a downstream fluid portion 146 at a corresponding second end that is sized and shaped to for coupling to the fluid inlet of a filtration system. The cage 136 includes features that are sized and shaped to define a fluid flow passage within the shell 134. The cage 136 includes a divider 140 that spans a cross section of the fluid flow passage and defines an internal aperture (e.g., grommet bore 131) that allows for fluid communication from one side of the divider 140 to the other side of the divider 140.

The grommet 132 is coupled to the divider 140 of the cage 136, and the cage 136 is installed within the shell 134. In various arrangements, the grommet 132 is formed of a material selected to provide a leak-proof or substantially leak-proof engagement to the divider 140 at the grommet bore 131 as well as the NFNR ball 130 (e.g., rubber). The grommet bore 131 is structured to provide a path of fluid flow 210 from one side of the divider 140 to the other side of the divider 140 upon installation in the cage 136. In addition, the divider 140 segments the fluid passage into an upstream portion 144 and a downstream portion 146 relative to the direction of fluid flow 210 through the fluid passage. The NFNR ball 130 is disposed in the upstream portion 144 segmented by the divider 140.

The NFNR ball 130 is configured to operatively engage the divider 140, i.e., interact with the divider 140 (either through direct or indirect contact) in a manner so as to block fluid flow 210 through the internal aperture and/or the grommet bore 131. While the NFNR ball 130 is substantially spherical in one embodiment, it should be understood that, in various arrangements, the NFNR ball 130 may not be perfectly or substantially spherical, instead having more of an oblong, oval or another shape. The NFNR ball 130 has a larger diameter than the grommet bore 131, and in some arrangements, is of a lesser density than the fluid filtered by an associated filter assembly. The NFNR ball 130 is structured for transient engagement to the divider 140 at the internal aperture and/or the grommet bore 131. Accordingly, in one arrangement, a fluid flow 210 may press the NFNR ball 130 up against the grommet 132 and block the grommet bore 131, thereby preventing passage of fluid through the divider 140. In turn, if the fluid flow abates, the NFNR ball 130 may disengage from the grommet 132 and expose the grommet bore 131. In addition, in some arrangements, a protrusion 138 extending from an interior wall of the shell 134 may be configured to position the NFNR ball 130 adjacent to the grommet bore 131 and prevent the NFNR ball 130 from getting trapped or stuck at a position within the upstream portion 144 away from the grommet 132.

As shown in FIGS. 3A and 3B, when a genuine or authorized filter element 101 is installed, the first NFNR pin 104 enters the pin aperture 142 of the NFNR attachment 120 and prevents the NFNR ball 130 from blocking the grommet bore 131 and stopping the fluid flow 210. The NFNR attachment is coupled to a pump inlet 122 disposed within the center tube 106 of the filter element 101. The pump inlet 122 is in communication with a fluid pump (e.g., an electric fluid pump, a mechanical fluid pump, etc.) that draws a fluid from a reservoir (e.g., fuel, oil, hydraulic fluid, water, etc.) through the genuine filter element 101, into the NFNR attachment 120, and into the pump inlet 122. Filtered fluid in the pump inlet 122 is then provided to a system via the associated pump, such as an internal combustion engine.

In operation, an associated fluid pump is actuated (e.g., via actuation of an associated internal combustion engine), giving rise to a fluid flow 210 across the filtration media 118, through the apertures of the center tube 106 and into the upstream fluid aperture 144 of the NFNR attachment 120. The fluid flow 210 encounters and flows into the NFNR ball 130; however, the first NFNR pin 104 prevents the NFNR ball 130 from moving into and blocking the grommet bore 131. As such, the fluid flow 210 may flow around the first NFNR pin 104 and the NFNR ball 130, through the grommet bore 131 into the downstream portion 146 of the NFNR attachment 120, into the pump inlet 122, and then to the system (e.g., the internal combustion engine).

Figure 3C:
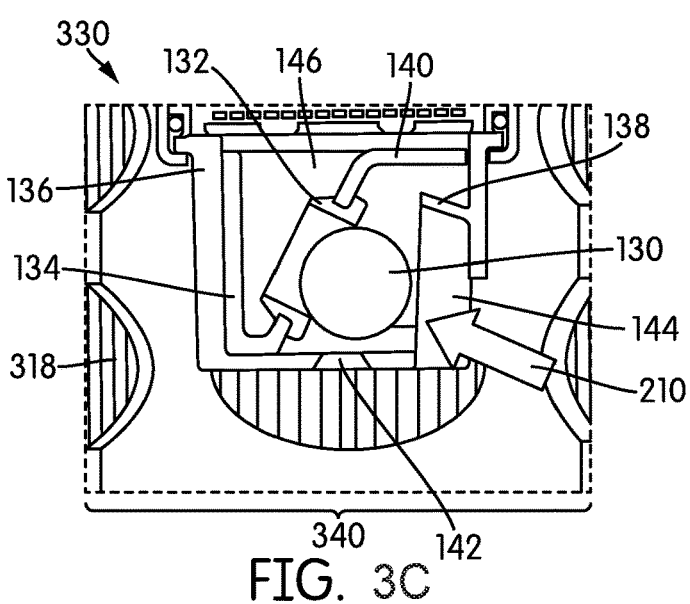
FIG. 3C is a lateral cross-sectional view of a portion of a fluid filtration assembly that includes the NFNR attachment disposed within a central bore of a non-genuine or unauthorized fluid filter.

Referring now to FIG. 3C, a second arrangement 330 of a fluid filtration assembly shows the NFNR attachment 120 disposed within a central bore of a non-genuine or unauthorized fluid filter 340. In the second arrangement 330, the pump inlet 122 and the NFNR attachment 120 may be structured in a substantially similar manner as described with respect to the first arrangement 300 of FIG. 3A, however the non-genuine fluid filter 340 is missing the first NFNR pin 104 of the first arrangement 300. As such, in operation, the fluid flow 210 may push the NFNR ball 130 into the grommet bore 131 of the grommet 132. Engagement of the NFNR ball 130 to the grommet 132 effectively prevents the fluid flow 210 from reaching the pump inlet 122, and therefore prevents the fluid flow 210 from reaching the system (e.g., the internal combustion engine). Similarly, the fluid flow 210 may push the NFNR ball 130 into the grommet bore 131 and block the fluid flow 210 if no fluid filter is coupled to the pump inlet 122.

The filter element 101 including the NFNR bidirectional pin element 102 is beneficial for a manufacturer that is unable to add a NFNR pin on an end plate due to shorter pump height, pump orientation, longer slit width media, and related issues. Since the NFNR bidirectional pin element 102 can ensure functionality of a NFNR ball system irrespective of assembly orientation, the element can be coupled onto an existing filtration system without significant modification to the existing electronic pump. The NFNR bidirectional pin element 102 can be coupled to these filtration systems without significant modification to the pump inlet 122. The NFNR bidirectional pin element 102 will assist in preventing possible system (e.g., internal combustion engine) damage that may be caused by unauthorized or non-genuine filter elements being installed or the absence of a filter element in an associated filtration system. This EIP feature would therefore reduce or eliminate warranty claims related to the system.

Figure 4:
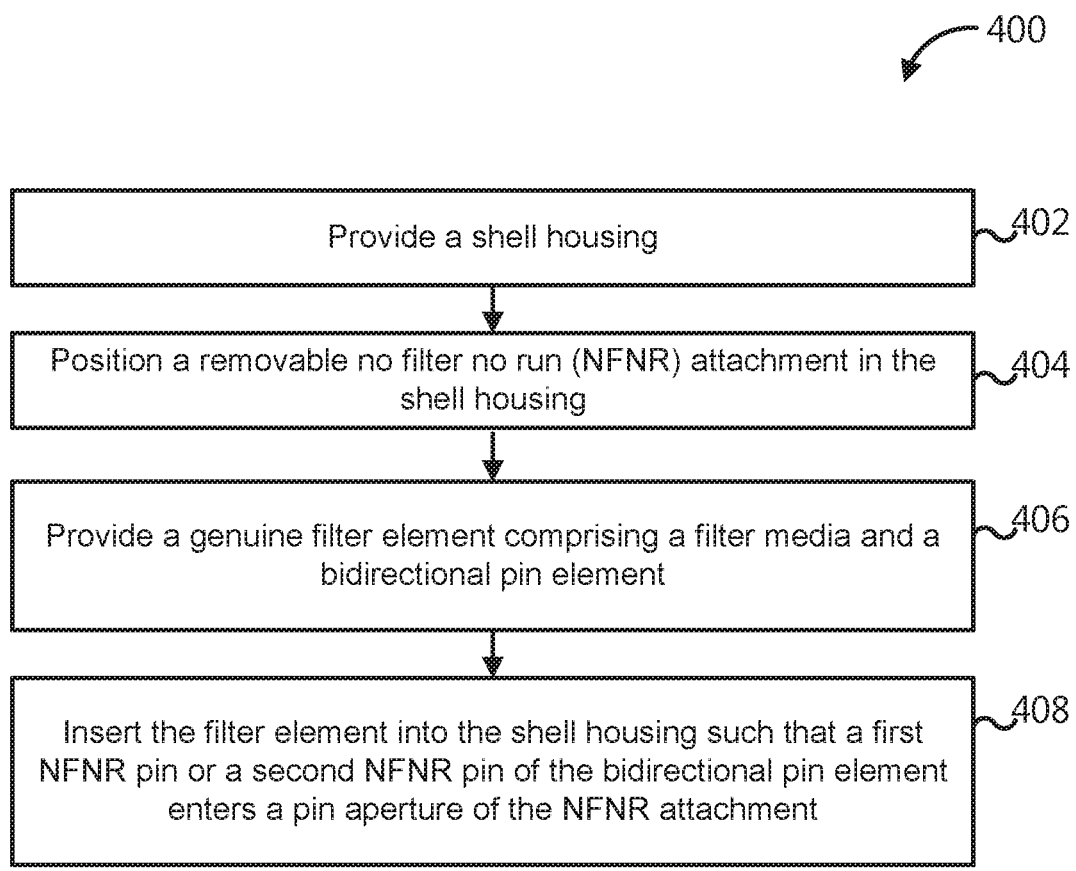
FIG. 4 is a schematic flow diagram of a method for forming a filtration assembly, according to an embodiment.

FIG. 4 is a schematic flow diagram of a method 400 for forming and installing a filtration assembly (e.g., the filtration assembly 100), according to an example embodiment. The method 400 comprises providing a shell housing, at 402. The shell housing is removably coupleable to a filtration housing. For example, the shell housing includes the shell housing 108 or any other shell housing described herein. A removable NFNR attachment is positioned in the shell housing, at 404. For example, the NFNR attachment 120 includes the NFNR ball 130 (i.e., the blocking element) and the divider 140 having the grommet 132 defining the grommet bore 131.

A genuine filter element comprising a filtration media and a bidirectional pin element is provided, at 406. The bidirectional pin element comprises a center tube formed as a single piece with a bidirectional pin. The bidirectional pin includes a first NFNR pin and a second NFNR positioned along a longitudinal axis of the filter element, and extending in opposite direction to each other. For example, the genuine filter element may include the filter element 101 including the filtration media 118 and the NFNR bidirectional pin element 102. As previously described herein, the bidirectional pin element 102 includes the first NFNR pin 104 and the second NFNR pin 105 which extend along the longitudinal axis of the filter element 101 from the bidirectional pin element 102 in opposite directions. In other words, the second NFNR pin 105 mirrors the first NFNR pin 104 and both are axially disposed relative to each other.

The genuine filter element is inserted into the shell housing, at 408. For example, the filter element 101 is inserted into the shell housing 108. The insertion causes the first NFNR pin (e.g., the first NFNR pin 104) or the second NFNR pin (e.g., the second NFNR pin 105) of the bidirectional pin element (e.g., the bidirectional pin element 102), based on an orientation of the filter element (e.g., the filter element 101), to enter a pin aperture of the NFNR attachment (e.g., the pin aperture 142 of the NFNR attachment 120). The bidirectional pin preventing the operative engagement of a blocking element (e.g., the NFNR ball 130) with a divider (e.g., the grommet 132 of the divider 140) inside the NFNR attachment so as to allow a fluid to flow therethrough. For example, the filter element 101 may be axially inserted into the filter housing right side up or upside down, and one of the first NFNR pin 104 or the second NFNR pin 105 would still engage the blocking element 130.

In some instances, the user may attempt to insert a non-genuine filter element into the shell housing which does not include the bi-directional pin. Insertion of such a non-genuine filter element does not prevent the operative engagement of the blocking element (e.g., the blocking element 130) with the divider (e.g., the grommet 132 of the divider 140) so that the blocking element continues to prevent the fluid from flowing through the NFNR attachment. Furthermore, removal of the genuine filter element (e.g., the filter element 101) causes the blocking element to operatively engage the blocking element so as to prevent fluid from flowing through the NFNR attachment (e.g., the NFNR attachment 120) in the absence of the genuine filter element (e.g., the filter element 101) from the shell housing (e.g., the shell housing 108).

In particular arrangements, the filter element may further comprise an endcap configured to secure the filter element with respect to the shell housing when the shell housing is received in the filtration housing. For example, the filter 101 comprises the top end cap 110 and the bottom end cap 112. Each of the end caps 110, 112 may include alignment tabs structured to be received in corresponding slots formed in the shell housing 108 so as to rotationally lock the filter element 101 with respect to the shell housing. Accordingly, when the shell housing 108 is installed by rotating the shell housing 108 into the filtration housing, the filter element 101 rotates with the shell housing 108.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, unless otherwise noted, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A filtration system comprising:
   a shell housing removably coupled to a filtration housing;
      a removable no filter no run attachment; and
      a filter element comprising:
         filtration media,
         a first endcap coupled to a first end of the filtration media, the first endcap defining a first central opening therethrough,
         a second endcap coupled to a second end of the filtration media opposite the first end, the second endcap defining a second central opening therethrough, and
         a bidirectional pin element, the bidirectional pin element comprising a center tube formed as a single piece with a bidirectional pin,
      wherein:
         the installation of the filter element and the shell housing into the filtration system results in the bidirectional pin entering a pin aperture of the removable no filter no run attachment and the bidirectional pin preventing the operative engagement of a blocking element with a divider inside the no filter no run attachment, and
         the removable no filter no run attachment being insertable through the first central opening of the first endcap or the second central opening of the second endcap.

2. The system of claim 1, wherein the removable no filter no run attachment comprises:
   a shell defining a fluid passage from an upstream fluid aperture at a first end for fluid receiving communication with the filter element to a downstream fluid aperture at a second end, the shell sized and shaped for coupling to a fluid pump inlet, the shell defining the pin aperture at the first end sized to receive the bidirectional pin from the filter element.

3. The system of claim 2, wherein the shell is structured such that the pump inlet is disposed within the center tube when the removable no filter no run attachment is coupled to the pump inlet, and the filter element and shell housing are installed in the filtration system.

4. The system of claim 2, wherein the divider segments the fluid passage into an upstream portion that comprises the upstream fluid aperture and the pin aperture and a downstream portion that comprises the downstream fluid aperture, the divider defining an internal aperture that allows fluid communication between the upstream portion and the downstream portion, and wherein the blocking element is a ball disposed in the upstream portion in fluid flow receiving communication with the upstream fluid aperture, the ball having a greater diameter than a diameter of the internal aperture such that an operative engagement of the ball with the divider within the internal aperture blocks fluid communication between the upstream portion and the downstream portion.

5. The system of claim 4, further comprising a grommet coupled to the divider concentrically within the internal aperture, the grommet defining a grommet bore providing fluid communication between the upstream portion and the downstream portion.

6. The system of claim 4, wherein the shell comprises an interior protrusion in the upstream portion, the interior protrusion structured to position the ball adjacent to the internal aperture.

7. The system of claim 1, wherein the filter element is structured to be received in the shell housing and the first endcap or the second endcap is configured to secure the filter element with respect to the shell housing when the shell housing is received in the filtration housing.

8. The system of claim 7, wherein each of the first endcap and the second endcap comprise alignment tabs configured to engage the shell housing and rotationally lock the filter element with respect to the shell housing.

9. The system of claim 1, wherein the bidirectional pin comprises:
a first pin and a second pin, the second pin being mirrored axially to the first pin, wherein the installation of the filter element and the shell housing into the filtration system results in the first pin of the bidirectional pin entering the pin aperture and the first pin of the bidirectional pin preventing the operative engagement of the blocking element with the divider.

10. The system of claim 1, wherein the bidirectional pin comprises:
a first pin and a second pin, the second pin being mirrored axially to the first pin, wherein the installation of the filter element and the shell housing into the filtration system results in the second pin of the bidirectional pin entering the pin aperture and the second pin of the bidirectional pin preventing the operative engagement of the blocking element with the divider.

11. The system of claim 1, wherein the shell housing comprises a base, wherein the base is opposite the no filter no run attachment and defines an opening, and wherein the opening is plugged and is leak resistant.

12. The system of claim 1, wherein the shell housing comprises a base wall, and wherein the base wall is opposite the no filter no run attachment and is formed of a material enabling leak resistant engagements when securing the filter element with respect to the shell housing.

* * * * *